UNITED STATES PATENT OFFICE.

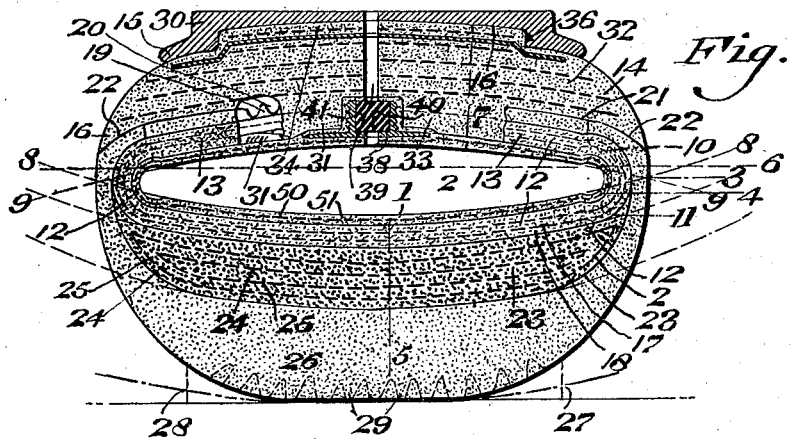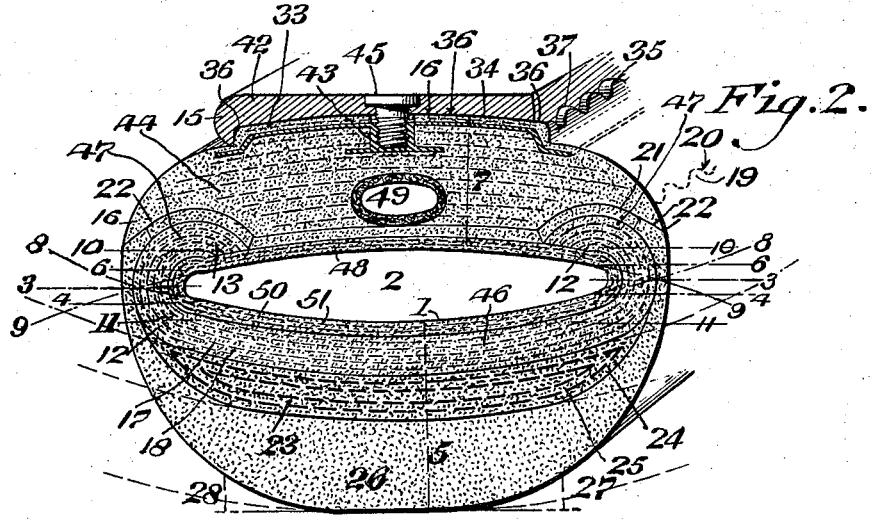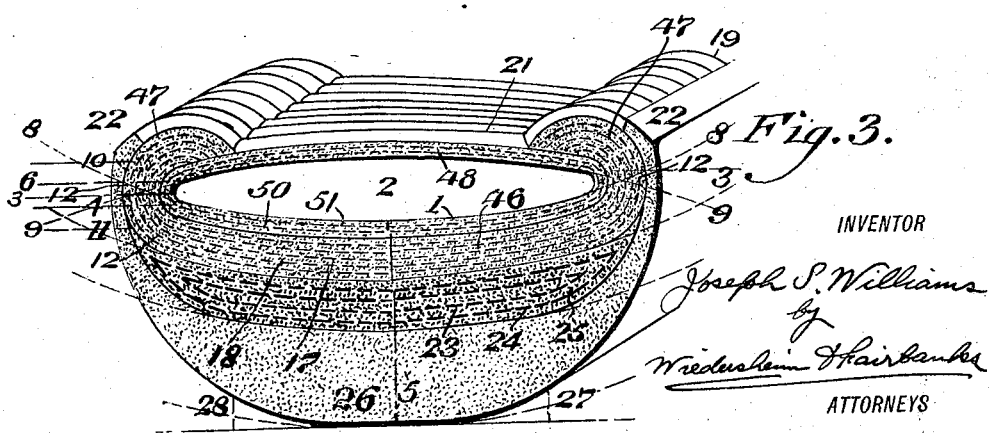

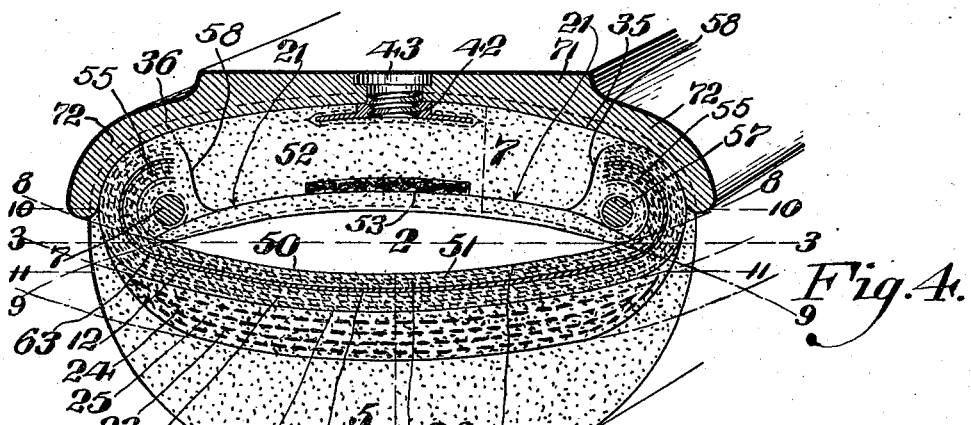
J. S. WILLIAMS.
RESILIENT TIRE.
APPLICATION FILED NOV. 13, 1917. RENEWED OCT. 1, 1921.
1,420,674. Patented June 27, 1922.
2 SHEETS—SHEET 2.
INVENTOR
Joseph S. Williams
BY
Wiederoheim & Fairbanks
ATTORNEYS

JOSEPH STOKES WILLIAMS, OF RIVERTON, NEW JERSEY.

RESILIENT TIRE.

1,420,674.  Specification of Letters Patent.  Patented June 27, 1922.

Application filed November 13, 1917, Serial No. 201,878. Renewed October 1, 1921. Serial No. 504,672.

*To all whom it may concern:*

Be it known that I, JOSEPH STOKES WILLIAMS, a citizen of the United States, residing at Riverton, in the county of Burlington, State of New Jersey, have invented a new and useful Resilient Tire, of which the following is a specification.

My present invention in its broad and generic scope consists of a novel resilient tire, wherein novel means are provided for reinforcing and supporting an annular tire body in the transverse planes of the major diameter of the tire, the construction being such that an outer circumferentially inextensible part is formed between which and the inner circumferentially inextensible rim member is placed an annular cushioning field, which latter may include an elastic fluid content or a non-compressible fluid content.

It further consists of a novel construction of a resilient tire in which the annular elements of the construction may be successively combined in interlocking and co-fitting engagement as an inwardly opening or closed construction so that the seating terminals and seating parts of the tire and rim equipment will interlock and be adapted for use with any desired or conventional type of rim.

It further consists of other novel features of construction, all as will be hereinafter fully set forth.

For the purpose of illustrating my invention, I have shown in the accompanying drawings those embodiments thereof which are at present preferred by me, since the same will give in practice, satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a transverse sectional view of a tire embodying my invention.

Figure 2 represents a perspective view with parts in transverse section of a tire embodying a modification of my invention.

Figure 3 represents a perspective view with parts in transverse section, of a part of a tire embodying my invention as shown in Fig. 2.

Figure 4 represents a perspective view with parts in transverse section of a tire embodying another modification of my invention.

Figure 5 represents a perspective view with parts in transverse section of a tire embodying another modification of my invention.

Figure 6 represents a transverse sectional view of a tire seating part with rim seating equipment embodying my invention.

Figures 7, 8 and 9, respectively, represent perspective views of tensile flexing elements of a tire embodying my invention.

Similar numerals of reference indicate corresponding parts in the figures.

Referring first to Figure 1, 1 designates a fluid tight tube transversely disposed in the zone of the major axis 3 and provided with a circumferential opening or clearance space 2 for fluid means of any desired character. The vertical axis is defined by the distance on radial lines between the outer annular portion 11 and the inner annular portion 10.

The tube 1 may be constructed in any desired manner and as shown consists of rubber reinforced with fabric 50, which may be in multiple layers with rubber or mineralized rubber 51 to provide resistance to puncture.

The walls of the tube 1 have a flattened arch formation on their inner and outer peripheries and the lines of such arch or curved formation are designated by the lines 8 and 9 representing arcs having a radius of one-half the diameter of a thirty-four inch wheel. The altitude of these curvatures from the transverse section lines 4 and 6, respectively, represent collectively the approximate range of altitude or normal tread deflection. The lines of curvature of the outer periphery of the tube 1 are defined and maintained by an annular belt or layer 12 of fabric and rubber or friction belting construction concentrically disposed relatively to the lines of curvature of the tube 1 and, in the present instance, is shown as consisting of multiple layers of fabric 17 bonded together with rubber 18, either vulcanized or mineralized if desired, to provide resistance to puncture. The sides of the annular layer 12 are curved at their ends to inclose the sides of the tube 1 and the terminals 13 are lapped by the inner cushioning member 14 and to a desired degree by the sides 15 of the rim member 30.

The terminals 13 are provided with transverse corrugations 19 which are adapted to interlock with the corrugations 20 of the cushion member 14, which extend transversely across the construction as shown by line 21, and in engagement with the part 22 at the sides, and if desired a water repellent cement 16 may be employed.

23 designates an annular member or layer consisting of multiple layers of fabric 24 bonded together with mineralized rubber 25 between the layers to form an annular flexible belt reinforcing the annular member 12 and resisting the pressure from within the construction and providing resistance to puncture. The flexible belt 23 is concentric with the inner lines of the member 12 and substantially throughout the major width of the tire the radial depth is substantially uniform with graduated flexing curvatures to the construction at the sides thereof. The tread 26 is vulcanized to the outer face of the annular belt 23 and is substantially concentric therewith on the transverse section lines of the construction throughout the major width of the surface of road contact as defined by the vertical lines 27 and 28 and with graduated flexing curvatures to the terminals 13 of the annular member 12.

The tread 26 is preferably rendered puncture proof, as well as wear and slip resisting, by forming the same of tough flexible rubber or rubber compound with relatively high resistance to compression having incorporated therewith suitable proportions of relatively hard wear and slip resisting material such as carborundum, or its equivalent in a suitable state of division. In order to provide a greater grip upon the road the contact surface is preferably pitted, as at 29 and the sides of 29 are tapered or curved to the bottom of the pits or recessed so that the outer surface will be continuously reinforced as the tread wears away. This pitting or recessing of the tread provides a substantially uniform depth of tread and does not interfere with the proper flexure of the tread on the annular and transverse section lines of the construction. The annular member 14 has a degree of flexibility to provide for its inward compression for placing it in or out of place on the terminals 13 and the co-fitting parts 13 of the tube 1, whereby the tube 1 may be inserted or removed so that the completed annular tire body may be formed or be separated or cemented together or vulcanized into a unit of structure. The annular member 14 may if desired be reinforced both annularly and transversely by fabric 32 or by reinforcing material 33, which if desired may include both metal and fabric. The member 14 is provided with an annular seating part 34 adapted to interlock with the rim member 30, which latter is adapted to be sprung inwardly to be placed upon or removed from the seating parts of the member 14 and to be expanded radially into compressive engagement with such parts, thus providing a positive retention of the tire and wheel equipment under all conditions with or without fluid pressure in the tube 1. The reinforcements of the member 14 render the same circumferentially inextensible, but the inner portion thereof is sufficiently compressible to provide for the radial expansion of the rim 30 on the seating part of the member 14 and the outer periphery of the wheel equipment. The reinforcements 32 render the layer 14 substantially inextensible laterally but permits the proper flexing of the construction and provides for resiliency between the seating parts of the member 14 and the line 6.

38 designates means for permitting the inflation of the tube 1, when desired, which is adapted to be actuated by a tubular needle like stem (not shown) adapted to pass through an aperture 39 extending through rim 30 and member 14 and thence through the aperture 40 of an elastic stopper 41 and through the casing parts in fluid tight union with the member 1.

In the embodiments seen in Figures 2 and 3 the construction is substantially the same as that seen in Figure 1. 42 designates the rim member, the construction of which corresponds substantially with that seen in Figure 1, except that the side flanges are constructed in a somewhat different manner. 43 is a screw-threaded socket vulcanized in the annular cushion 44. 45 is a screw engaging the member 43 and passing through the rim 42 to secure the rim in unit of structure with the tire construction.

46 designates an annular belt having terminals 47 which are in close coinage with the sides of the fluid tight tube 48, the terminals 47 corresponding to the terminals 13 seen in Figure 1. If desired, a fluid tight tube 49 may be located within the cushion 44. The member 44 is provided with transversely or corrugated grooved parts 35 adapted to interlock wtih the channel 36, and the transverse corrugation 37 on the outer face of the transversely divided rim 42.

The construction seen in Figure 2 may be an inwardly opening one so that a portion thereof, as seen in Figure 3, may be removed, the parts seen in Figure 3 being united to the rest of the construction by a water repellent material which will yield for separation of the parts when the construction is immersed in a fluid bath of a desired temperature.

In the embodiment seen in Figure 4 the principles involved are substantially the same as in the embodiments already described. 71 designates the rim provided with side flanges 72. 52 is the inner annular cushion corresponding to 14, seen in Figure 1, and this cushion may have an insert of rubber 53. 54 designates an annular reinforcement of metal transversely disposed and having curvatures at the sides around the terminals 55 of the annular belt 56, which latter corresponds to the belt 12 in Figure 1 and the belt 46 in Figure 2. The cushion 52 has at the sides thereof the annular reinforcing rods 57 which serve to reinforce the construction annularly and transversely. The cushion 52 may if desired be separate from the other parts of the construction on line 58, it being understood that suitable valve equipment is provided if desired for the inflation of the tube 59.

In the embodiment seen in Figure 5 the construction is substantially the same as that seen in the other figures of the drawing, except that the cushion 60 is compressible inwardly by fluid under pressure in the tube 61 so as to compress such member, as indicated by the dotted line. The seating parts of the cushion 60 interlock with the rim 62 in a similar manner to that already described with reference to Figures 2 and 4.

In the embodiment seen in Figure 6 the transversely divided rim equipment, similar to that seen in Figures 4 and 5, is shown which is adapted to be used with wheel equipment of the clincher type.

In the embodiments seen in Figures 7, 8 and 9, I have shown metal reinforcements adapted to be employed in a similar manner to the metal reinforcement 54 seen in Figure 4; and the metal reinforcement 63, seen in Figure 5. In Figure 7, 64 designates a metal reinforcement which is split at the sides to form the individually flexing parts 65. In Figure 8, the metal reinforcement is shown as having the curved sides 66 integral and as having the body portion thereof transversely cut, as at 67. In Figure 9, this metal reinforcement is shown as consisting of individual elements 68 which would have to be supported by textile material, or its equivalent in the manner seen in Figure 4.

If an incompressible fluid content is to be used in the inner tube of the embodiment shown herein, I preferably employ glycerine or a mixture thereof with other material which will not be injuriously affected by change of the temperature, which from its nature will move freely and have a lubricating action and such material is preferably under a low degree of pressure so that there will be practically no initial strain on the construction. If desired, the tread may have embodied therein fibrous material 69 providing tensility and carborundum 70 in a homogeneous mixture in suitable proportions to provide a flexible tread with high standards of resistance to compression and wear suitable for any purposes, especially for heavy loads.

In all the embodiments of my invention herein described, I provide for reinforcing the construction in close proximity to the major transverse diameter of the tire with a flattened arch formation having an altitude of curvature in balancing ratio to the flexures of the construction in the annular zone and in the zone of impact along the surface of road contact. This belt or reinforcement is circumferentially inextensible across the construction to the sides of the construction with close coinage at the sides to the field of inner support which extends to the rim. The annular reinforcement is increased to any desired extent by additional belting reinforcement concentric therewith throughout the width of the tread belt 5 and with curvatures to the sides of the construction. The tread belt is secured to the outer periphery of such reinforced portion thereby providing a large area of support therefor in the transverse section lines which has such standard of circumferential inextensibility as to provide resistance for any internal pressure or strain and for distributing and resisting strains arising from the road contact of the tire.

In each case between the annular belt or reinforcement which is outwardly of the major transverse axis and the rim, I provide a support 7 extending across the width of the construction into union with the terminals of reinforcement from the outer field. The inner support is preferably made circumferentially inextensible independently of or in connection with the rim support which latter extends across the transverse width of the seating parts to a greater or less degree beyond the rim equipments to or towards the sides of the construction. Between the inner and outer circumferentially inextensible portion is a portion of low resistance which extends transversely throughout the greater width of the tire. The altitude of the clearance space between the inner and outer portions of the construction on opposite sides of the major transverse axis provides for the flexure of the construction without resistance other than that offered by the construction itself, or by the fluid content within such clearance space, which latter extends substantially throughout the width to the inner sides of the annular reinforcement, the altitude of the clearance space being such as to limit any undue or excessive strain upon the construction due to load, impact or deflation. A constant support is maintained between the inner and outer parts of the construction at the sides thereof. The construction provides a large area of constant resilient support on transverse section lines in the major width and thereby provides for lower pressures of fluid content and for easy flexures of the construction, which further provides for the use of tread material of relatively hard or incompressible nature for heavy loads. The metal reinforcements such as shown in Figures 7 to 9, inclusive, provide for giving any desired resilient load supporting capacities and reinforcement in the outer field of the construction, so that such construction will operate either with or without fluid pressure in providing constant resilient support for load.

It will be seen that I employ an annular flexible member inextensible circumferentially such as 51, an annularly and transversely disposed cushioning portion or support, such as 7, a clearance space as 2 preferably formed by a fluid tight tube 1. I may employ an annular metal reinforcement as 63 or 64 and an annular reinforcement belt such as 23. The sides of the tension belt form belt terminals or abutments and the entire tire or annular body forms an annular and transverse resilient truss. The tension of the belt and of the metal member may be varied by insertion of mobile material under pressure or by the manner in which the tire is secured on the wheel, or the demountable equipment, or in all of such ways.

In all the embodiments shown the annular tire body is reinforced and supported on transverse section lines relatively to the major diameter and provides for practical uniformity of flexure in balanced relationship to the annular portions of normal deflection of 20 to 25 degrees in length of tread contact, whereby the body of flexing and balanced tread part will be circumferentially inextensible, puncture proof and wear and slip resisting and inwardly flexible with uniformity of support by tensile flexing or elastic or incompressible fluid or by combination of such and cushioning means in rim equipments.

It will be evident that by forming my tire construction to flex to or near a flat form so as to have the total normal deflection straighten out without reversing curvatures of the arch, or span upon the outer part of the tire or the two spans upon the outer and inner parts respectively of the tire, or by providing the formation to undulate in the zone of and more or less across the determined transverse section lines, there will be small elemental deflection and variations.

Substantial uniformity of elemental deflection and variation in all parts of the tire across the compressive zone of the tread and tire will be obtained by preserving a practical uniformity of curvature or parallelarity throughout the depth, or thickness of tread and flexing parts in such field.

By reason of the small amount of elemental deflection throughout the width of the tread in the compressive zone, I am enabled to approximate the surface conditions present in a tire of many times the surface diameter of the present tires, and to make use of a flexible stiffening material, or metal, or a combination of material in reinforcement to give high tensile standards of resistance to internal pressure and resilient supports as well as effective high standards of resistance to puncture, wear and slip which would be prohibited by the extent of deflection in the ordinary tire, and from which I gain not only these advantages but effective resistance to distortion, uniformity of tread deflection for tread and constancy of resilient altitude without sacrificing the resiliency of the tire.

My construction widens the surface deflected and proportionately reduces the length along the surface of the tire and the extent of flexure required longitudinally for any given area of support and provides a maximum and practically constant area for flexure and fluid content support with adequate altitude radially for flexure free from useless or dangerous excess whereby cushioning support and safety are primarily and positively secured without sacrificing resiliency and even so as to provide for operating with low or high pressures and making the tires suited for light or heavy loads or easy riding almost as may be desired, with a range of considerable variation.

It will be seen that the respective annular elements of construction forming respective inner and outer parts may be formed separately with materials thereof disposed on the transverse section lines so as to be combined to form an annular unit of inwardly opening or a closed unit of tire construction and adapted to receive or have removed therefrom the fluid tight member 1 as desired with the parts co-fitting and interlocking together, with or without being cemented together with any suitable water repellent material, or by being vulcanized into a unit of structure with annular and transversely disposed parts in the seatings of the tire construction for co-fitting and locking in reversely formed parts of the rim member shown adapted for special, as well as various well known kinds of wheel rim equipments and so as to provide positive retention of the tire member in wheel equipment.

In all the embodiments of my invention I obtain high standards of tensility and flexure in the outer part of the zone of major diameter and like standards in the elements of resistance to puncture and tread wear and slip and practically constant area of support for flexure and distributive tread throughout the width of the tire, so that the actual flexure in each of the elements, or units of outer and inner parts of the tire is very small and the lateral movement is likewise small and the fluid pressure areas at the sides of the tire may be very small, or practically eliminated.

It will be seen that my tire construction is especially designed and adapted to provide for the use of tread part of tough tensile resilient material with relatively high initial standards of resistance to compression and that I can advantageously employ relative hard wear and slip resisting materials in uniform embodiment with tough flexible bonding material and thereby obtain a tread possessing almost any desired standard of resistance to wear and slip. To such end I employ in suitable proportion and with uniformity carborundum, emery, or suitable mineral substance of such nature, or the equivalent thereof in a graded, granulated, powdered or subdivided state of division in or with vulcanized rubber, or compounds with rubber, with or without suitable fibrous material or asbestos fibre or the like as indicated by 69 for increased tensility and mould such product with suitable form upon the inner supporting reinforcements in the annular and transverse planes of the construction as herein clearly defined and vulcanized such parts into unit of structure.

By such means with my tire construction the prime cost of tread construction may be materially decreased and the mileage life largely increased with safety against skidding so that the cost and mileage of life may represent not more than one quarter of the present cost, per auto mile.

It will now be apparent that I have devised a novel and useful construction of a resilient tire which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a tire, an annular flexible member inextensible circumferentially and having a laterally extending arch formation on annular and transverse section lines of the tire to the sides outwardly of the major transverse axis and in close proximity to it with side curvatures forming abutments substantially on said axis, an annular and transversely disposed cushioning portion inwardly thereof and partially surrounded at the sides by the terminals of said flexible member, and an annular belt of reinforcement outwardly of said flexible member.

2. In a tire, an inner cushioning member an annular flexible belt circumferentially inextensible and having an arch formation on transverse section lines outwardly of the major transverse axis of the tire, and having its sides inwardly and laterally deflected in close formation to form abutments substantially on said axis and contributing with said inner member to form a clearance space, the inner and outer walls of which have an arch formation, the depth of the belt being substantially uniform throughout the major portion of the width of tread contact, and a tread encircling said belt.

3. In a tire, an annular flexible belt circumferentially inextensible and having an arch formation on transverse section lines of the construction outwardly of the major transverse axis and having its sides inwardly and laterally deflected in close formation to form abutments substantially on said axis and contributing to form a clearance space, the inner and outer walls of which have an arched formation, an annular metal reinforcement transversely disposed in said belt and having its sides extending to the sides of the belt, the depth of the belt being substantially uniform throughout the major portion of the width of tread contact, and a tread encircling said belt.

4. In a tire, an inner annular cushion transversely disposed, an annular reinforcing belt contributing with said cushion to form an elliptical shaped clearance space and having its sides deflected around and in close formation with the sides of said clearance space, and forming abutments substantially on the major transverse axis and a tread carried by said reinforcement, said tread and belt being substantially concentric and having a flattened arch formation on transverse section lines of the construction.

5. A tire, comprising, an inner cushion, a tube of elliptical formation exterior of said cushion and uniformly supported thereby, an annular reinforcing belt of fabric and metal transversely disposed in arch formation on transverse section lines of construction and having its sides deflected upon itself to form abutments substantially on the major transverse axis of the tire and yieldingly supported by said cushion, and a tread encircling said belt.

6. A tire comprising an annular body having, a transversely disposed cushion adapted to be secured to a support and having its outer periphery in flattened arch formation, a universely flexible tension belt transversely disposed in arch formation on transverse section lines with curvatures at the sides forming abutments substantially on the major transverse axis and yieldingly supported by said cushion and forming therewith a transversely disposed clearance space, and a tread encircling said belt.

7. A tire comprising an annularly and transversely disposed resilient cushion adapted to be assembled outwardly of a support, a tension belt transversely disposed in arch formation on transverse section lines outward of said cushion, and contributing with said cushion, to form an annular clearance space around the side terminals of which the belt is inwardly and laterally deflected to form belt terminals substantially on the major transverse axis and yieldingly supported by said cushion, and a tread encircling said belt.

8. A tire having the portion outwardly of and in close proximity to its major transverse axis in cross section in flattened arch formation with curvatures at the sides in close formation to form side abutments substantially on said axis, a tread outwardly of and supported by said flattened arch formation, and an annular yielding cushion inwardly of and in supporting relationship with said abutments and having its inner portion adapted to be secured to an inner support.

JOSEPH STOKES WILLIAMS.

Witnesses:
H. S. FAIRBANKS,
C. D. McVAY.